No. 748,856. PATENTED JAN. 5, 1904.
H. H. FOX.
WEIGHING SCOOP.
APPLICATION FILED SEPT. 11, 1903.
NO MODEL.

Witnesses:
F. G. Hachenberg,
Henry Thieme

Inventor:
Henry H. Fox
by attorneys
Brown & Seward

THE NORRIS PETERS CO., PHOTO-LITHO., WASHINGTON, D. C.

No. 748,856.

Patented January 5, 1904.

UNITED STATES PATENT OFFICE.

HENRY H. FOX, OF NEWBURGH, NEW YORK.

WEIGHING-SCOOP.

SPECIFICATION forming part of Letters Patent No. 748,856, dated January 5, 1904.

Application filed September 11, 1903. Serial No. 172,734. (No model.)

*To all whom it may concern:*

Be it known that I, HENRY H. FOX, a citizen of the United States, and a resident of Newburgh, in the county of Orange and State of New York, have invented a new and useful Improvement in Weighing-Scoops, of which the following is a specification.

My invention relates to improvements in a combined hand scoop and scale, and has for its object to provide a very simple and effective device in which the scoop is locked to the handle while being used to remove the contents to be weighed and which may then be unlocked from its rigid connection with the handle for permitting the weighing of the contents of the scoop.

A further object is to provide a device of the above character which will be very strong and durable and will not be liable to get out of order and in which the tension of the spring for the bar which supports the scoop may be accurately adjusted for insuring accurate operation of the scale-pointer.

A practical embodiment of my invention is represented in the accompanying drawings, in which—

Figure 1:
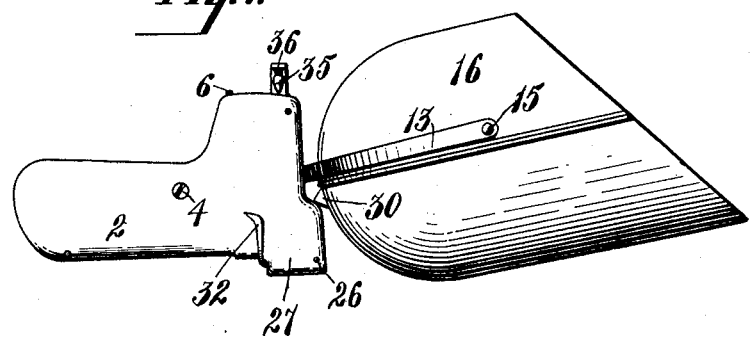
Figure 2:
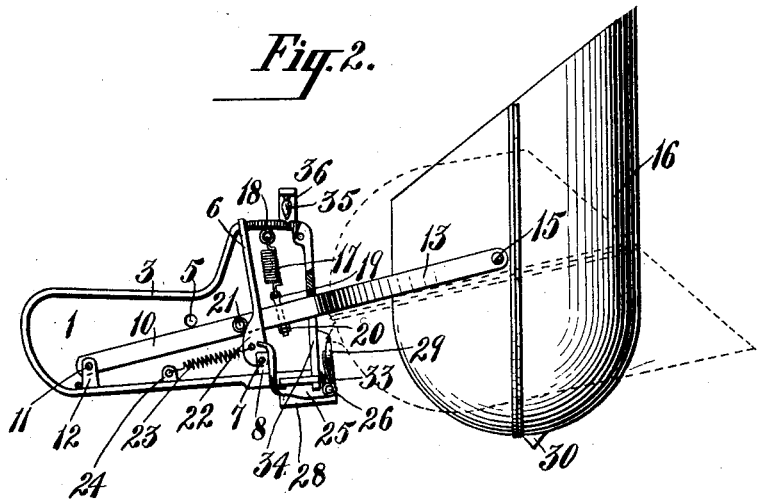
Figure 3:
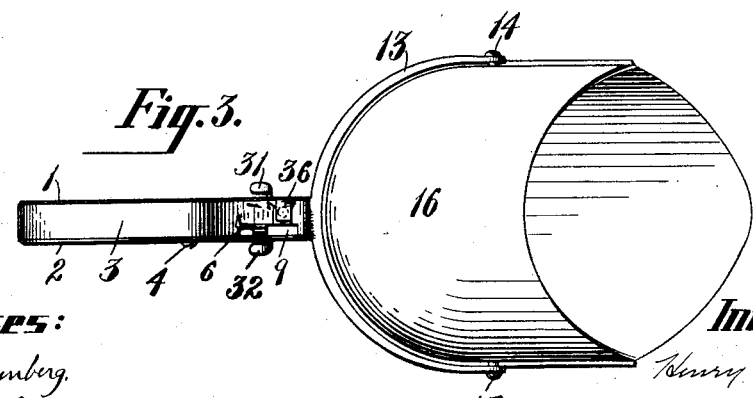

Figure 1 is a view in side elevation of my improved combined hand scoop and scale, showing the scoop locked to the handle, as when used for removing a portion of the contents of a receptacle. Fig. 2 is a similar view with the scoop unlocked from its engagement with the handle and one of the side plates of the handle removed to show more clearly the working parts of the scale and the means for locking and releasing the handle and scoop, and Fig. 3 is a top plan view of the device.

The hollow handle of the device comprises two side walls 1 and 2 and a marginal wall 3, connecting the edges of the two side walls. The side wall 2 is made removable, so as to gain access to the interior of the handle. This side wall 2 in the present instance is removably secured in position by means of a screw 4, which passes through the side wall 2 and has a screw-threaded engagement in a hole 5 in the opposite side wall 1 of the handle. A spring-held pointer 6 is hinged at 7 to a lug 8 in the interior of the handle, the free end of the pointer 6 projecting outwardly through an elongated slot 9 in the marginal wall 3 of the handle. The marginal wall 3 may have suitable subdivisions marked thereon along the edge of the elongated slot 9, along which subdivisions the free end of the pointer 6 is caused to travel as it is operated by the scale-lever.

The scale-lever is denoted by 10 and is hinged at its rear end, as shown at 11, to a lug 12 in the interior of the handle. This lever 10 projects outwardly through a vertical elongated slot 34 in the front of the marginal wall 3. The forward end of the bar 10 is preferably bifurcated, the ends of the arms 13 of which are pivoted, as shown at 14 and 15, to the opposite sides of a suitable scoop 16. The bar 10 is normally supported at the limit of its upward movement by means of a spring 17, one end of which is attached to an eye 18, secured to the interior of the marginal wall 3 and the other end of which is secured to an eyebolt 19, having a screw-threaded engagement with the bar 10. The tension of the spring 17 may be accurately adjusted by screwing the bolt 19 a greater or less degree into the bar 10 and there locked by a suitable lock-nut 20.

The bar 10 is connected with the pointer 6, so as to indicate the weight of the contents of the scoop 16 by the following device: A stud-roller 21 is mounted upon the side of the bar 10 within the handle, which roller is caused to engage a cam 22, formed on the rear edge of the pointer 6 adjacent to its hinged connection with the lug 8. A light spring 23 has one end connected to the pointer 6 and its other end connected to a lug 24 on the interior of the handle for holding the pointer in engagement with the roller 21.

The means which I have shown for locking the scoop to and unlocking it from the handle is constructed and arranged as follows: A locking-lever 25 is hinged on a pintle 26 exterior to the handle, which pintle is mounted in extensions 27 28 of the side walls 1 and 2 thereof. The lever 25 is provided with an upwardly-extended arm 29, which is fitted to engage an abutment or shoulder 30, formed on the rear end of the scoop 16. The rear arm of the lever 25 is bifurcated to form two thumb-pieces 31 32, which are extended upwardly in close proximity to the exterior faces of the side walls 1 and 2 of the handle for use in rocking the arm 29 inwardly to release the scoop 16. The lever 25 is held yieldingly in position to lock the scoop to the handle by means of a spring 33, which spring in the present instance is coiled about the pintle 26 and has one leaf in engagement with the front face of the marginal wall 3 and its other leaf in engagement with the upwardly-extended arm 29 of the rocking lever.

It is desirable to produce the most accurate results in weighing that the device should be held in a horizontal plane. To accomplish this, I provide the top of the handle with a swinging indicator 35, carried by an upwardly-projected lug 36, which indicator registers with a mark on the marginal wall 3 of the handle when the handle is in a horizontal position.

The device, as above described, is very simple, strong, and durable and is one in which the scale may be very accurately adjusted. By means of the locking and releasing lever 25 for connecting and disconnecting the scoop and handle the operator is permitted to release the scoop from its engagement with the handle after the material has been placed in the scoop by a slight downward pressure upon one of the thumb-pieces 31 32 of the lever, which are brought into convenient reach of the hand which grasps the handle.

It is evident that slight changes might be resorted to in the form, construction, and arrangement of the several parts without departing from the spirit and scope of my invention. Hence I do not wish to limit myself strictly to the structure herein set forth; but What I claim is—

1. In combination, a hollow handle, a scale consisting of a bar hinged within the handle, a scoop carried by the free end of the bar and means for temporarily locking the scoop to the handle comprising a spring-actuated rocking lever having one arm arranged to engage the scoop and another arm developed into thumb-pieces extended upwardly along the opposite side walls of the handle for use in operating the lever.

2. In combination, a hollow handle, a scale consisting of a bar hinged within the handle to swing upwardly and downwardly, a scoop carried by the free end of the swinging bar exterior to the handle, a counterbalance-spring connecting the bar within the handle for holding the bar at the limit of its upward movement, a pointer hinged within the handle and engaged by said bar and means for temporarily locking the scoop to the handle.

3. A combined hand scoop and scale comprising a hollow handle, a bar hinged within the handle, a scoop carried thereby, a counterbalance-spring for the bar, means for adjusting the tension of the spring and a pointer having a cam-and-stud engagement with the bar whereby the pointer is operated by the bar and a spring for holding the cam on the pointer in engagement with the stud on the bar.

4. A combined hand scoop and scale comprising a hollow handle, a bar hinged within the handle, a scoop carried thereby, a counterbalance-spring for the bar, a pointer controlled by the bar and an indicator carried by the handle for use in bringing the handle into a horizontal position.

In testimony that I claim the foregoing as my invention I have signed my name, in presence of two witnesses, this 31st day of July, 1903.

HENRY H. FOX.

Witnesses:
FREDK. HAYNES,
GEORGE BARRY, Jr.